(12) United States Patent
Fraser

(10) Patent No.: US 6,827,375 B2
(45) Date of Patent: Dec. 7, 2004

(54) END FITTING TUBULAR MEMBERS AND METHOD OF APPLYING SAME

(75) Inventor: Dana J. Fraser, Panama City, FL (US)

(73) Assignee: Wellstream International Limited, Newcastle Upon Tyne (GB)

( * ) Notice: Subject to any disclaimer, the term of this patent is extended or adjusted under 35 U.S.C. 154(b) by 19 days.

(21) Appl. No.: 10/261,518

(22) Filed: Oct. 1, 2002

(65) Prior Publication Data

US 2003/0111839 A1 Jun. 19, 2003

Related U.S. Application Data

(60) Provisional application No. 60/340,610, filed on Dec. 13, 2001.

(51) Int. Cl.$^7$ .......................... F16L 33/00; B29D 39/00
(52) U.S. Cl. ...................... 285/258; 285/256; 285/259; 29/507; 29/508
(58) Field of Search ................................ 285/256, 258, 285/259; 29/506, 507, 508, 521

(56) References Cited

U.S. PATENT DOCUMENTS

| | | | | |
|---|---|---|---|---|
| 2,146,756 A | * | 2/1939 | Miller .......................... 285/258 |
| 2,228,018 A | * | 1/1941 | Scholtes .................. 285/222.4 |
| 2,258,919 A | * | 10/1941 | Wallace ........................ 72/399 |
| 2,262,228 A | * | 11/1941 | Garretson .................... 285/258 |
| 2,268,142 A | * | 12/1941 | Lusher et al. ................ 285/258 |
| 2,399,790 A | * | 5/1946 | Conroy .......................... 29/507 |
| 2,433,425 A | * | 12/1947 | Burckle .................. 285/148.16 |
| 2,810,594 A | * | 10/1957 | Walsh et al. ................. 285/258 |
| 3,211,476 A | * | 10/1965 | Wagner ........................ 285/258 |
| 3,490,793 A | * | 1/1970 | Wagner ........................ 285/93 |
| 3,539,207 A | * | 11/1970 | Harris ......................... 285/256 |
| 3,665,591 A | * | 5/1972 | Kowal ............................ 29/507 |
| 4,544,187 A | * | 10/1985 | Smith .......................... 285/256 |
| 5,096,234 A | * | 3/1992 | Oetiker ........................ 285/256 |
| 5,190,323 A | * | 3/1993 | Oetiker ......................... 285/39 |
| 5,207,460 A | * | 5/1993 | Oetiker ........................ 285/258 |
| 5,317,799 A | * | 6/1994 | Chapman et al. ............. 29/508 |
| 5,484,174 A | * | 1/1996 | Gotoh et al. ............. 285/382.2 |
| 5,492,376 A | * | 2/1996 | Usui et al. .................. 285/382 |
| 5,984,377 A | * | 11/1999 | Struthers et al. ............ 285/258 |

FOREIGN PATENT DOCUMENTS

| | | | | |
|---|---|---|---|---|
| GB | 2 000 840 A | * | 7/1978 | ................ 285/258 |
| GB | 2 057 615 A | * | 3/1979 | ................ 285/258 |

* cited by examiner

Primary Examiner—James M. Hewitt
(74) Attorney, Agent, or Firm—Klarquist Sparkman LLP

(57) ABSTRACT

An end fitting for tubular member and a method of applying an end fitting to a tubular member, according to which an end portion of the tubular member is placed in an annular space defined between an outer ferrule and a tubular insert having a tapered inner wall and a radially outwardly-directed force is applied to the insert to force it into engagement with the tubular member.

16 Claims, 2 Drawing Sheets

END FITTING TUBULAR MEMBERS AND METHOD OF APPLYING SAME

This application claims priority of Provisional Application Ser. No. 60/340,610 filed Dec. 13, 2001.

BACKGROUND

This invention relates, in general to a swaged end fitting for tubular members and a method of applying same.

Flexible tubular pipes for transporting fluids, such as those used in the oil and gas industry, are well known and usually consist of a inner tubular member surrounded by one or more layers of materials that add strength to the pipe while maintaining flexibility and an outer sheath to insulate the inner layers from the elements. Each of these type pipes must be fitted with an end fitting to enable the pipes to be connected to each other or to other components. However, many end fittings are not secured to the end of the pipe adequately to withstand significant tension on the pipe. Therefore, what is needed is an end fitting, and a method of applying same, according to which the grip by the end fitting on the pipe increases as tension on the pipe increases.

DETAILED DESCRIPTION

Figure 1:
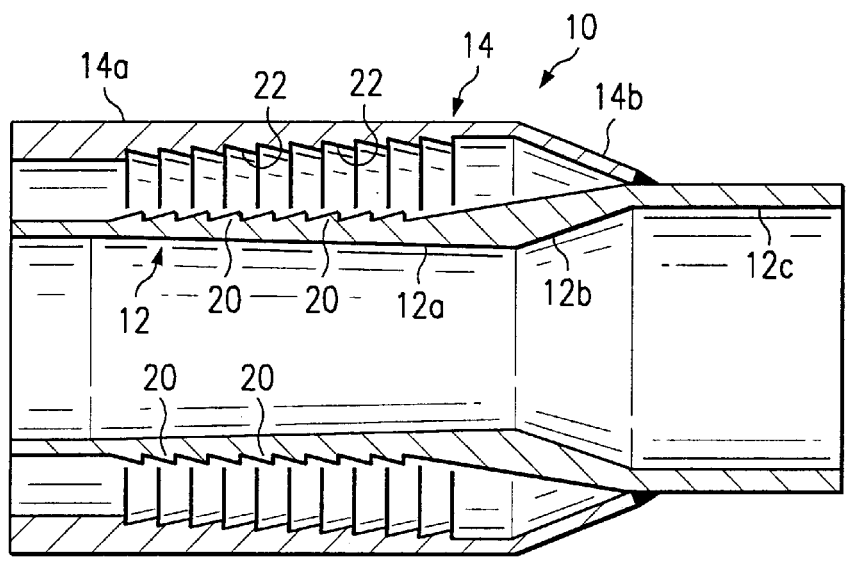
FIG. 1 is a cross sectional view of an end fitting according to an embodiment of the present invention.

Referring to FIG. 1 of the drawings, the reference numeral 10 refers, in general, to an end fitting according to an embodiment of the invention. The fitting 10 includes a tubular insert 12 formed by a section 12a, a section 12b extending from the section 12a, and a section 12c extending from the section 12b. Preferably, the sections 12a, 12b, and 12c are all formed integrally.

The inner wall of the section 12a is tapered radially inwardly at a relatively small angle to the axis of the insert 12 in a direction from left-to-right as viewed in FIG. 1, and the inner and outer walls of the section 12b are tapered radially outwardly at two different, relatively large angles, respectively. Thus, the inner and outer diameters of the section 12c are greater than those of the section 12a.

An outer ferrule 14 extends around the insert 12, and is formed by a section 14a having an inner wall extending in a spaced, generally parallel, relation to the insert and tapered radially outwardly at a relatively small angle to the axis of the member in a direction from left-to-right as viewed in the drawing. As a result an annular space is formed between the outer wall of the insert section 12a and the inner wall of the ferrule section 14a which increases in diameter in a direction from left-to-right as viewed in the drawings.

The ferrule also includes a section 14b that extends from the section 14a and is tapered radially inwardly in the above direction at a relatively large angle. The distal end of the section 14b extends to the section 12c of the insert 12 and is secured to the latter section in any known manner, such as by welding.

A plurality of serrations 20 are formed on the outer wall of the section 12a of the insert 12, and a plurality of serrations 22 are formed on the inner wall of the section 14a of the ferrule 14 and are axially aligned with the serrations 20. The serrations 20 and 22 extend around the entire circumference of the outer wall of the section 12a and the inner wall of the section 14a, respectively, and are axially spaced along these walls. Thus, an annular space is formed between the serrated portions 20 and 22 of the insert 12 and the ferrule 14, respectively.

Figure 2:
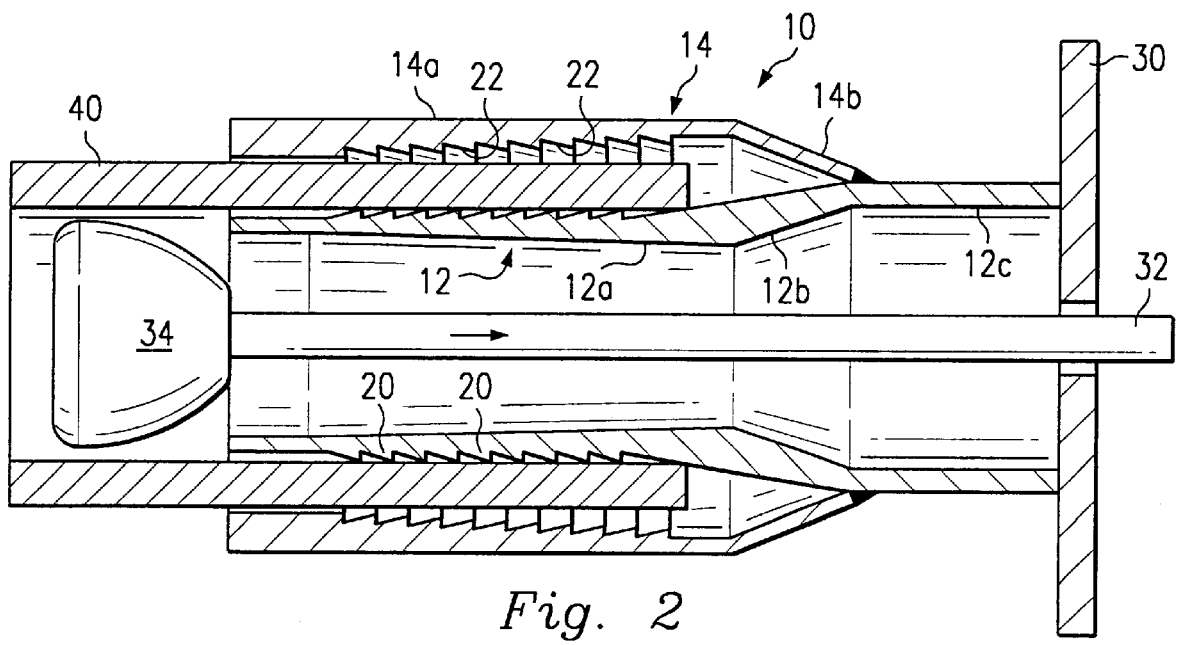
FIGS. 2–4 are views similar to FIG. 1 but depicting the end fitting and a tubular member to be fitted in various stages of assembly.

Referring to FIG. 2, the fitting is installed into, and supported by, a swaging machine including a wall 30 against which one end of the insert section 12c abuts, and a ram 32 extending through an opening in the wall. A dolly 34 is fixed to one end of the ram 32, and, in its initial position shown in FIG. 2, extends just outside the corresponding ends of the fitting 10 and the ferrule 14. The dolly 34 is tapered in cross section and its largest outer dimension is slightly greater than the diameter of the other end of the section 12a of the insert 12 for reasons to be described. The swaging machine includes a prime mover (not shown) connected to the other end of the ram 32 for reciprocating the ram in a direction from left-to-right and from right-to-left, as viewed in FIG. 2.

The end fitting 10 is designed to be attached to an end portion of a tubular member 40 (FIG. 2) which, for the purpose of example only, is in the form of a flexible pipe formed, at least in part, by a thermoplastic material. To this end, the end portion of the tubular member 40 is inserted in the above-mentioned annular space between the serrated portions 20 and 22 of the insert 12 and the ferrule 14, respectively. The ram 32, and therefore the dolly 34, are then forced in a direction shown by the arrow in FIG. 2 from left-to-right from the position of FIG. 2 to the position of FIG. 3. This causes the tapered surface of the dolly 34 to engage the inner wall of the section 12a of the insert 12 and to expand, or swage, the section 12a radially outwardly as indicated from a comparison of FIGS. 2 and 3. The serrations 20 on the outer wall of the section 12a are thus forced into the inner wall of the tubular member 40 to lock the end fitting 10 to the tubular member. Due to the tapered inner wall of the section 12a the radially outwardly-directed forces exerted by the dolly 34 on the section 12a increase progressively as the dolly moves in the left-to-right direction to facilitate and increase the engagement of the serrations 20 with the end fitting 10.

After this is completed, an external swage operation may be performed. To this end, the other end of the ferrule 14 is placed in engagement with a tapered outer surface of a tool die 44 shown in FIG. 3 and having an inner diameter less than the outer diameter of the ferrule 14.

Figure 3:
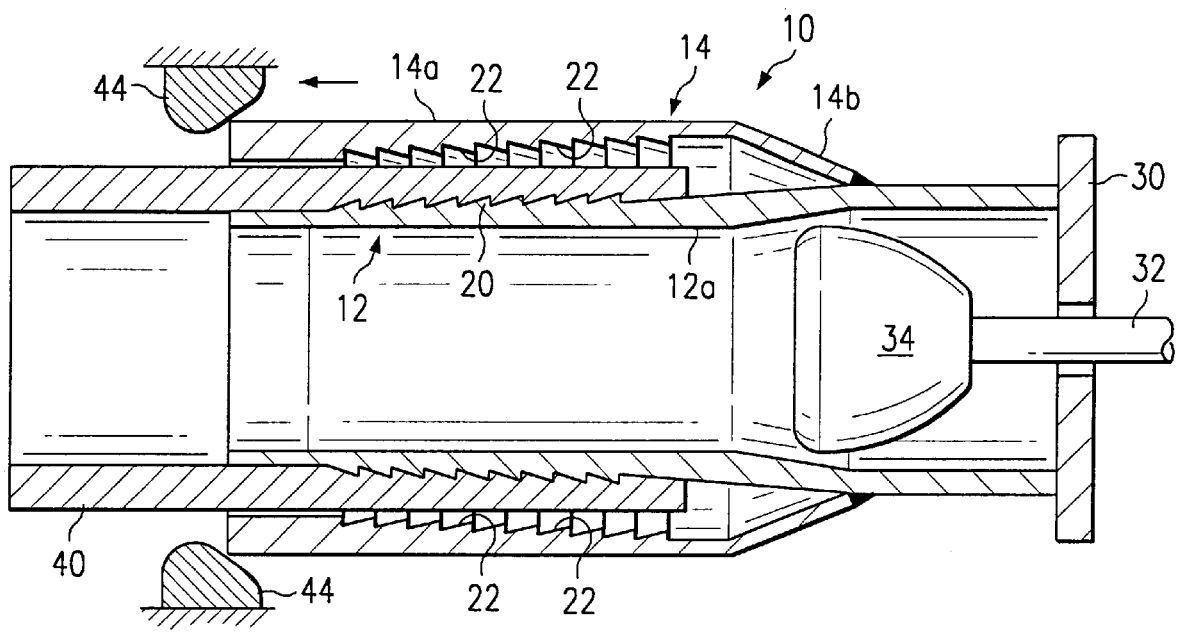
Figure 4:
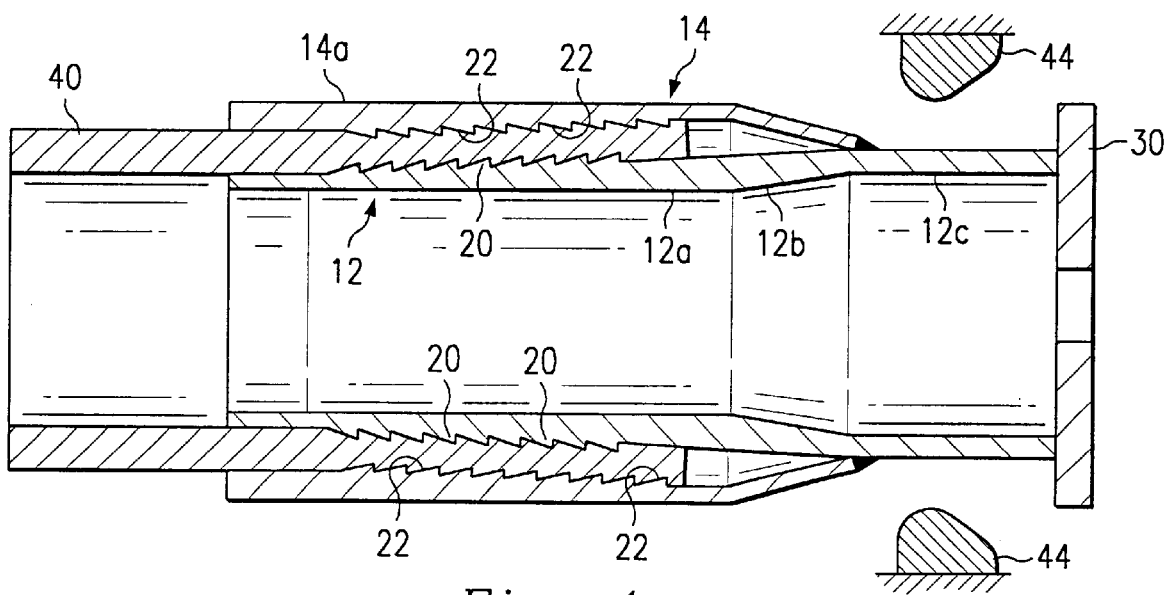

The dolly 34 is removed from the end of the ram 32 and the ram 32 is repositioned relative to the plate so that, when activated, it forces the plate 30 and therefore the insert 12, the ferrule 14, and the tubular member 40 in a direction from right-to-left from the position of FIG. 3 to the position of FIG. 4 as shown by the arrow in FIG. 3. This causes the tapered surface of the tool die 44 to engage the outer wall of the section 14a of the ferrule 14 and to force, or swage, the section 14a radially inwardly as indicated from a comparison of FIG. 3 and FIG. 4. The serrations 22 on the inner wall of the section 14a are thus forced into the outer wall of the tubular member 40 to further lock the end fitting 10 to the tubular member. The tapered inner wall of the section 14a facilitates the engagement of the serrations 22 with the end fitting 10.

Variations may be made in the foregoing without departing from the scope of the invention. For example, the invention is not limited to both internal and external swaging, as described above, but is applicable to either technique taken alone. Also, the spatial orientation and movement referred to above is for the purpose of example only and can be varied within the scope of the invention. Further, the quantity, shape and orientation of the serrations 20 and 22 can be varied within the scope of the invention. For example, the serrations can be eliminated and surface texturing employed. Further, the serrations 20 and 22 do not have to be aligned. Still further, the sections 12a, 12b, 12c, 14a and 14b of the insert 12 and the ferrule 14 can be integral or can be formed separately and have optional joints. Moreover, the tubular member 40 can be in the form of a rigid pipe, a conduit, a hose, or any other similar device.

Although only a few exemplary embodiments of this invention have been described in detail above, those skilled in the art will readily appreciate that many other modifications are possible in the exemplary embodiments without materially departing from the novel teachings and advantages of this invention. Accordingly, all such modifications are intended to be included within the scope of the invention.

What is claimed is:

1. A method for applying a fitting to a pipe, the method comprising:

mounting an outer ferrule around a tubular insert to define an annular space;

inserting an end portion of the pipe in the annular space;

passing a force-applying member through the insert to force the insert into engagement with the end portion of the pipe; and moving the ferrule, the insert and the pipe in a direction towards a tool die to force the ferrule into engagement with the end portion of the pipe;

wherein the ferrule, the insert and the pipe are moved in a direction opposite the direction of movement of the force-applying member.

2. The method of claim 1 wherein the inner wall of the ferrule is tapered radially outwardly in the direction of passage of the force-applying member.

3. The method of claim 2 wherein the outwardly tapered inner wall is formed on a first section of the ferrule, and wherein a second section of the ferrule is tapered radially inwardly in the direction of passage of the force-applying member through the insert.

4. The method of claim 1 wherein a plurality of serrations are formed on the outer wall of the insert and on the inner wall of the ferrule so that when the insert and the ferrule are forced into engagement with the end portion of the pipe, the serrations engage the pipe.

5. The method of claim 1 further comprising progressively increasing the force applied by the force-applying member and the force applied by the tool dies during the steps of passing and moving, respectively.

6. The method of claim 1 wherein the inner wall of the insert in tapered radially inwardly in a direction corresponding to the direction of passage of the force-applying member.

7. The method of claim 1 wherein the tool die is tapered in a manner so that the force applied by the tool die on the ferrule progressively increases during the step of moving.

8. An end fitting for a pipe, the end fitting comprising:

a tubular insert;

an outer ferrule extending around the insert to define an annular space for receiving an end portion of the pipe;

the inner wall of the insert being tapered radially so that when a first force-applying member is passed through the insert it applies a radially outwardly-directed force against the inner wall of the insert thus forcing the insert into engagement with the end portion of the pipe;

the inner wall of a first portion of the ferrule being tapered radially outwardly in the direction of passage of the first force-applying member so that when relative movement occurs between a second force applying member and the ferrule, a radially inwardly-directed force is applied against the outer wall of the ferrule thus forcing the ferrule into engagement with the end portion of the pipe; and a second portion of the ferrule being tapered radially inwardly in the direction of passage of the first force-applying member through the insert, wherein an end of the inwardly tapered inner wall of the ferrule engages the insert.

9. The end fitting of claim 8, further comprising a plurality of serrations on the outer wall of the insert and on the inner wall of the ferrule so that when the insert and the ferrule are forced into engagement with the end portion of the pipe, the serrations engage the pipe.

10. The end fitting of claim 8 wherein the radially outwardly directed force and the radially inwardly directed force increase progressively as the first force-applying member is passed through the insert and as the relative movement occurs, respectively.

11. The end fitting of claim 8 wherein the ferrule is moved in a direction opposite the direction of movement of the first force-applying member.

12. The end fitting of claim 11 wherein the inner wall of the insert is tapered radially inwardly in the direction of passage of the first force-applying member.

13. The end fitting of claim 12 wherein the inwardly tapered inner wall is formed on a first section of the insert and wherein the insert further comprises a second section extending from the first section and having an inner wall tapered radially outwardly in the direction of passage of the first force-applying member.

14. The end fitting of claim 13 wherein the inner wall of the first section of the insert is tapered radially inwardly at a relatively small angle to the longitudinal axis of the insert, and the inner wall of the second section of the insert is tapered radially outwardly at a relatively large angle.

15. The end fitting of claim 13 wherein the second section of the insert has an outer wall tapered radially outwardly in the direction of passage of the force-applying member through the insert.

16. The end fitting of claim 15 wherein the outer wall of the second section of the insert is tapered at a different angle than the inner wall of the second section.

* * * * *